United States Patent [19]

Hug et al.

[11] Patent Number: 5,128,912
[45] Date of Patent: Jul. 7, 1992

[54] APPARATUS INCLUDING DUAL CARRIAGES FOR STORING AND RETRIEVING INFORMATION CONTAINING DISCS, AND METHOD

[75] Inventors: Paul Hug, Saratoga; Graham Slater, Foster City; Bill Umeda, San Jose; Paul A. Yesnosky, Sunnyvale, all of Calif.

[73] Assignee: Cygnet Systems Incorporated, San Jose, Calif.

[21] Appl. No.: 219,553

[22] Filed: Jul. 14, 1988

[51] Int. Cl.⁵ .................. G11B 17/22; G11B 5/016; G11B 17/04
[52] U.S. Cl. .................. 369/38; 360/99.02; 360/99.06; 369/34; 369/35; 369/36
[58] Field of Search .......... 360/99.02, 99.06; 369/34, 35, 36, 37, 38, 39

[56] References Cited

U.S. PATENT DOCUMENTS

| | | | |
|---|---|---|---|
| 2,104,032 | 1/1938 | Green | 194/239 |
| 2,275,033 | 3/1942 | Mitchell | 369/38 |
| 2,940,068 | 6/1960 | Stiefel | 360/88 |
| 2,952,463 | 9/1960 | Vanderzee | 369/34 |
| 3,119,501 | 1/1964 | Lemelson | 414/273 |
| 3,134,550 | 5/1964 | Camras | 242/181 |
| 3,149,529 | 9/1964 | Critchlow | 355/41 |
| 3,215,285 | 11/1965 | Happel | |
| 3,407,949 | 11/1968 | Fegley | |
| 3,484,055 | 12/1969 | Raine | 242/181 |
| 3,774,172 | 11/1973 | Silverman | 369/59 |
| 3,846,836 | 11/1974 | Masse et al. | 369/194 |
| 3,854,604 | 12/1974 | Peterson et al. | |
| 3,983,190 | 9/1976 | Norback | 261/111 |
| 4,063,651 | 12/1977 | Chino | |
| 4,101,027 | 7/1978 | Kohl et al. | 206/309 |
| 4,127,882 | 11/1978 | Kohl et al. | 360/98.05 |
| 4,133,540 | 1/1979 | Torrington | 369/77.2 |
| 4,143,408 | 3/1979 | McGinnis et al. | |
| 4,145,758 | 3/1979 | Drexler et al. | 369/44 |
| 4,168,835 | 9/1979 | Omiya et al. | 369/262 |
| 4,271,440 | 6/1981 | Jenkins | 360/92 |
| 4,271,489 | 6/1981 | Siryj et al. | 369/38 |
| 4,286,790 | 9/1981 | Siryj et al. | 369/36 |
| 4,527,262 | 7/1985 | Manto | 369/33 |
| 4,566,087 | 1/1986 | Kraft | 369/36 |
| 4,607,354 | 8/1986 | Ishibashi et al. | 369/36 |
| 4,608,679 | 8/1986 | Rudy et al. | 369/36 |
| 4,614,474 | 9/1986 | Sudo | 369/36 |
| 4,742,504 | 5/1988 | Takasuka et al. | 369/36 |
| 4,815,055 | 3/1989 | Fago, Jr. | 369/36 |
| 4,815,056 | 3/1989 | Tio et al. | 369/36 |
| 4,817,071 | 3/1989 | Carlson et al. | 369/36 |
| 4,827,463 | 5/1989 | Motoyoshi et al. | 369/36 |
| 4,855,980 | 8/1989 | Hug et al. | 369/36 |
| 4,860,133 | 8/1989 | Baranski | 360/137 |
| 4,878,137 | 10/1989 | Yamashita et al. | 369/36 |
| 4,903,252 | 2/1990 | Tanaka et al. | 369/36 |
| 4,945,429 | 7/1990 | Munro et al. | 360/92 |

FOREIGN PATENT DOCUMENTS

| | | |
|---|---|---|
| 517613 | 1/1955 | Belgium . |
| 2210818 | 9/1973 | Fed. Rep. of Germany . |
| 910625 | 6/1946 | France . |
| 56-12416 | 9/1981 | Japan . |
| 60-224144 | 11/1985 | Japan . |

Primary Examiner—Stuart S. Levy
Assistant Examiner—Christopher R. Glembocki
Attorney, Agent, or Firm—Flehr, Hohbach, Test, Albritton & Herbert

[57] ABSTRACT

A technique for storing and retrieving information-containing discs using two independently operated disc transferring carriages is disclosed herein. The two carriages are used to transfer discs between storage compartments forming part of an overall disc and drive library and one or more disc drives disposed within their own drive compartments also forming part of the disc and drive library. In one specific embodiment, the two carriages are moved vertically and horizontally on separate tracks between two confronting library arrangements.

25 Claims, 6 Drawing Sheets

APPARATUS INCLUDING DUAL CARRIAGES FOR STORING AND RETRIEVING INFORMATION CONTAINING DISCS, AND METHOD

This invention relates generally to techniques for storing and retrieving information-containing media, and more particularly to a specifically designed technique which, in a preferred embodiment of the present invention, uses two separate, independently operated carriages for transferring information-containing discs between storage compartments and disc drives forming part of an overall disc and drive library.

There are many different arrangements for storing and retrieving information-containing media. Examples of these arrangements or "jukeboxes", as they are often called, may be found in U.S. Pat. No. 4,271,489 (RCA); U.S. Pat. No. 4,608,679 (Filenet); and U.S. Pat. No. 4,527,262 (Manto). In each of these patents, the particular arrangement illustrated there uses a storage area or magazine for storing information-containing discs, a disc drive and some sort of carriage mechanism for transferring discs between the storage magazine and drive. In each of these arrangements, in order to transfer a given disc between a specific storage compartment and a disc drive, a single carriage mechanism is used. Should that mechanism break down, the entire apparatus becomes inoperative. Moreover, the overall speed of operation of the apparatus is limited to the speed at which the carriage mechanism can move between a given storage compartment and a disc drive.

As will be described in detail hereinafter, applicants have taken an entirely different approach in which the drawbacks as recited are reduced. More specifically, applicants have designed an apparatus for storing and retrieving information-containing discs in which two independently operated carriage assemblies are used to transfer information-containing discs between storage compartments and disc drives forming part of an overall disc and drive library. It is an object of the present invention to provide such an apparatus.

It is another object of the present invention to provide a dual carriage disc storage and retrieval apparatus designed in an uncomplicated and reliable manner.

A more general object of the present invention is to provide a technique for transferring information-containing discs between storage compartments and disc drives such that one disc can be transferred into or out of one storage compartment of a disc drive while a second disc is being transferred into or out of a different storage compartment or disc drive or such that two information-containing discs can be simultaneously transferred between different pairs of storage compartments and disc drives.

Another general object of the present invention is to provide a disc storage and retrieval apparatus which is designed to operate with less downtime and faster than any of the heretofore available arrangements.

As will be described in more detail hereinafter, the storage and retrieval apparatus disclosed herein includes a disc and drive library including a plurality of individual storage compartments for storing information-containing discs and at least one and preferably two or more drive compartments, each containing a disc drive for storing information on and retrieving information from a cooperating disc. In accordance with the present invention, this apparatus also includes first and second separate carriage means, each of which is designed to transfer an information-containing disc between any two storage compartments or between a disc drive and any one of the storage compartments. These two carriage means are operated to move independent of each other in order to cause them to transfer information-containing discs between compartments of the library such that the first carriage means can be used to transfer one disc into or out of one of the storage or drive compartments while the second carriage means is used to independently transfer a second disc into or out of a second one of the storage or drive compartments.

Thus, while one of the carriage means is, for example, retrieving a given information-containing disc from a particular storage compartment for use in a particular disc drive, the other carriage means can be simultaneously moving another disc out from that specific disc drive. On the other hand, while one carriage means is transferring a particular disc between one storage compartment and a particular disc drive, the other carriage means could be simultaneously transferring a second disc between a second storage compartment and a second disc drive. In that way, these operations can be carried out faster than would be the case if a single carriage means were used. Moreover, should one of the carriage means temporarily become inoperative, the entire arrangement is designed so that the other carriage means can continue its operation, thereby keeping the entire apparatus on-line.

In a preferred embodiment of the present invention, the disc and drive library forming part of the present apparatus is made up of two spaced apart but confronting library arrangements, each of which has compartments arranged in a plurality of horizontal rows vertically aligned on top of one another so as to define a plurality of vertical columns. The two carriage means in this preferred embodiment are supported for both vertical and horizontal movement between these two library arrangements on separate parallel tracks. These tracks preferably extend beyond the libraries and into a maintenance area so that each carriage means can be easily brought into the maintenance area for servicing. The present arrangement and its method of operation will be described in detail below in conjunction with the drawings, wherein:

Figure 1:
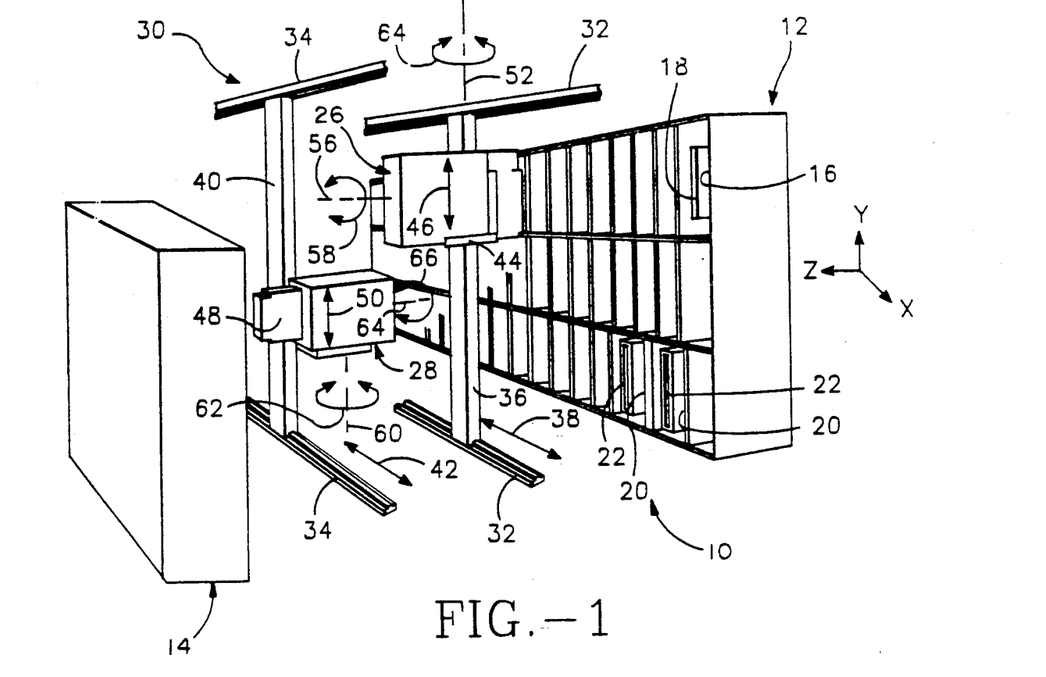
FIG. 1 is a perspective view diagrammatically illustrating an apparatus for storing and retrieving information-containing discs designed in accordance with the present invention and including, specifically, a pair of independently operated carriage assemblies.
Figure 2:
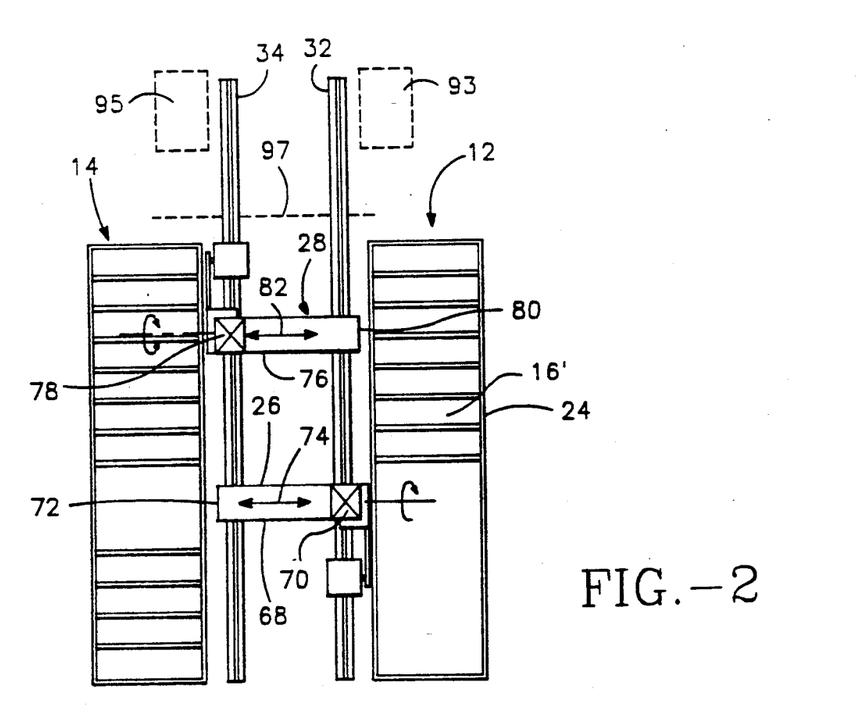
FIG. 2 is a diagrammatically depicted top plan view of the apparatus shown in FIG. 1.

Turning now to the drawings, wherein like components are designated by like reference numerals throughout the various figures, attention is first directed to FIGS. 1 and 2 which, as stated above, illustrate an apparatus for storing and retrieving information-containing discs in accordance with the present invention. This overall apparatus is generally indicated by the reference numeral 10 and is shown including a pair of disc and drive libraries 12 and 14. Library 12 is comprised of a plurality of storage compartments 16 for storing information-containing discs 18 and at least one but preferably more than one drive compartment 20 for storing a disc drive 22. As shown best in FIG. 1, compartments 16 and 20 are arranged in a plurality of horizontal rows vertically aligned on top of one another so as to also define a plurality of vertical columns. In the diagrammatically depicted embodiment of FIGS. 1 and 2, the library arrangement 12 includes two drive compartments 20, each of which contains a disc drive 22. The remaining compartments in this arrangement are disc storage compartments, at least one of which also serves as a "mail box". The mail box is shown diagrammatically in FIG. 2 at 16' and differs from the other disc storage compartments in that it has a suitable opening in its back end, as indicated at 24 for allowing information storage discs to be placed into the overall system and removed from it through that compartment, as will be seen hereinafter. Library arrangement 12 may include one or more such mail boxes and some may be provided for placing discs into or removing discs from the library only, as will be seen in the contemplated actual working embodiment.

Library arrangement 14 may be identical to arrangement 12 to the extent that it may include similar disc storage compartments, similar drive compartments containing disc drives and similar mail boxes. However, the number of these different compartments in each library arrangement may differ. In fact, in the contemplated working embodiment, the library arrangement 14 includes only disc storage compartments. In any event, as best illustrated in FIG. 2, the two library arrangements are positioned in spaced apart, parallel confronting relationship to one another with their front open ends of respective compartments facing each other.

As will be described in more detail hereinafter, overall apparatus 10 is intended to transfer information-containing discs between disc storage compartments 16 and disc drive 22. In actual practice, these information-containing discs, which are well known in the art, are contained within their own individual cartridge housings and each housing is designed to provide ready access to its disc therein. For purposes of convenience, in most cases herein, reference will be made merely to the disc, although it is contemplated that the disc is contained within a cooperating cartridge housing. At the same time, it is to be understood that the present invention is equally applicable for storing and retrieving other types of media containing information, for example, tapes. However, for purposes of convenience, the only type of media to be referred to herein will be information-containing discs, for example 5¼" magnetic floppy discs. Other discs are also contemplated, for example, optical discs, hard discs, or the like.

It is also to be understood that disc drives 22 are conventional or readily providable devices for storing information onto and retrieving information from the information-containing discs or other such media and these devices do not per se form part of the present invention. They must be at least capable of retrieving (reading) information contained on information-containing discs 18 and they are preferably capable of storing (writing) information onto the discs. In addition, while each disc drive may be of the type which is able to read and write on both sides of the disc simultaneously, using two read/write heads, in a contemplated working embodiment each disc drive uses only one read/write head and is able to read and write on one side of the disc only. Disc drive units 22 are of that type.

Before going on, in order to more fully understand the operation of overall apparatus 10, it is important to note that library arrangements 12 and 14 extend horizontally in what will be referred to as the X direction and vertically in what will be referred to as the Y direction. They face one another in the Z direction. In addition, each of the disc storage compartments 16 is designed to vertically contain a disc 18 and each drive compartment 20 is designed to vertically contain a disc drive 22. For purposes of convenience, the remaining description of apparatus 10 will be based on this vertical orientation of discs 18 and disc drives 22 within this X, Y, Z coordinate system. It is to be understood, however, that the present invention is not limited to that coordinate system or vertically supported discs and disc drives.

Still referring to FIGS. 1 and 2, overall apparatus 10 includes first and second separate carriage assemblies 26 and 28, respectively, for transferring information-containing discs 18 between storage compartments 16 and disc drives 22. These carriage assemblies are independently supported for movement between storage compartments 16 and drive compartments 20 by an overall carriage support arrangement 30 to be generally described immediately below, along with carriage assemblies 26 and 28 and to be described in more detail hereinafter along with carriage assemblies 26 and 28 in conjunction with FIGS. 5-10. As illustrated best in FIG. 1, carriage support arrangement 30 includes a first pair of vertically aligned upper and lower straight tracks 32 and a second pair of similar tracks 34. Both sets of tracks extend in the X direction between library arrangements 12 and 14. Tracks 32 support a vertically extending post 36 for back and forth movement along the tracks in the X-direction, as indicated by two-way arrow 38. In a similar manner, a second vertically extending post 40 is supported for back and forth movement along tracks 34, as indicated by two-way arrow 42. Carriage assembly 26 is supported by means generally indicated at 44 for back and forth vertical movement in the Y-direction along post 36, as indicated by two-way arrow 46. In a similar manner, assembly 28 is supported by suitable means generally indicated at 48 for back and forth vertical movement along post 40, as indicated by two-way arrow 50.

Means 44 and 48 will be described in more detail hereinafter in conjunction with FIGS. 5-10. For the time being, it suffices to state that means 44 also supports carriage assembly 26 for rotation about the vertical axis 52, as indicated by two-way arrow 54 and about horizontal axis 56 (extending in the Z-direction), as indicated by two-way arrow 58. In a similar manner, means 48 supports carriage assembly 28 for rotation about a vertical axis 60, as indicated by two-way arrow 62, and for rotation about horizontal axis 64 (extending in the Z-direction), as indicated by two-way arrow 66.

As best seen in FIG. 2, tracks 32 and 34 are sufficiently long so that posts 36 and 40 and their respective carriage assemblies can be moved from one end of each library arrangement to its opposite end. As best seen in FIG. 1, the posts 36 and 40 are sufficiently tall so that each carriage assembly can be moved from the base of each library arrangement to its top end. Thus, each carriage assembly ca be located in front of any given storage compartment 16 or drive compartment 20 in either library arrangement 12 or 14. In addition, for reasons to be discussed hereinafter, each carriage assembly is rotatable 180° back and forth about its respective horizontal and vertical axes or it could be made to rotate 360° in one direction about these axes.

Referring specifically to FIG. 2, carriage assembly 26 is shown including its own carriage frame 68 for containing a disc 18 therein and a disc engaging and disengaging mechanism 70 mounted within frame 68 for back and forth movement between the front end 72 of the frame and its back end in order to pull the disc into and push it out of the frame, as indicated by two-way arrow 74. In a similar manner, carriage assembly 28 includes a carriage frame 76 and a disc engaging and disengaging mechanism 78 mounted within the frame for back and forth movement between the frame's front end 80 and its back end, as indicated by two-way arrow 82.

Figure 3:
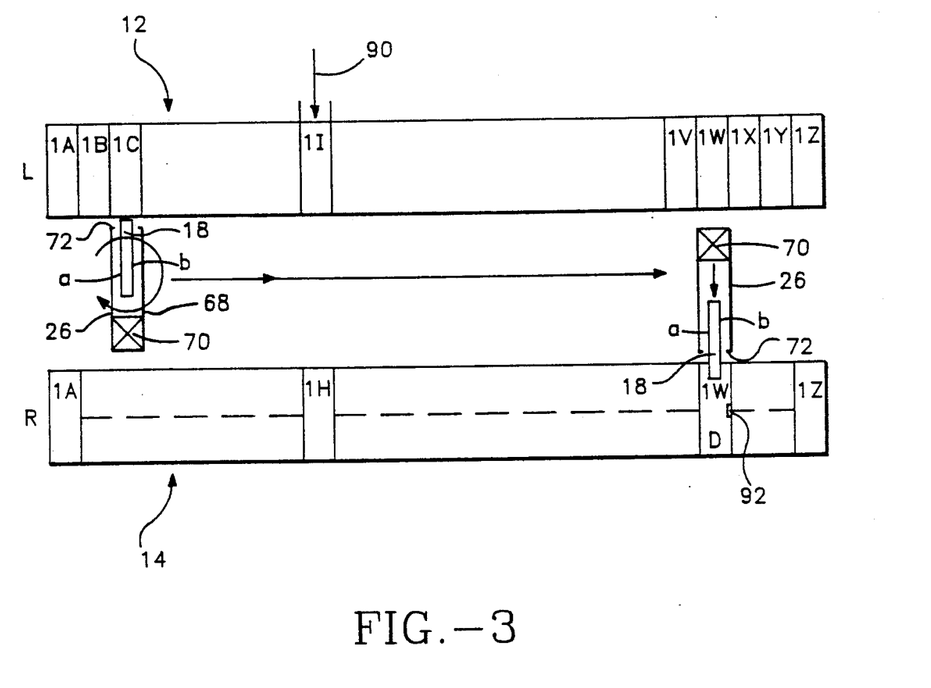
FIGS. 3 and 4 diagrammatically illustrate specific operating features of the apparatus shown in FIGS. 1 and 2.
Figure 4:
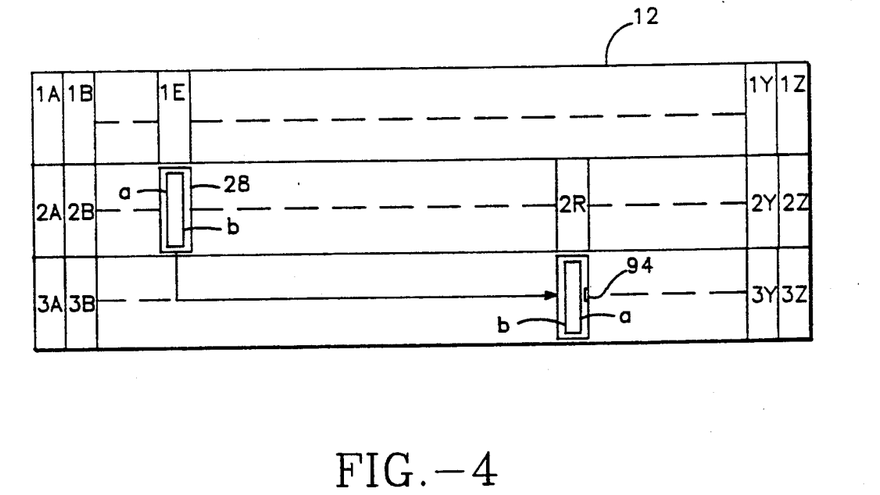

Having structurally described much of overall apparatus generally and before describing the apparatus in more detail, attention is directed to the way in which it functions to transfer information-containing discs between storage compartments 16 and disc drives 22. To this end, attention is directed to FIGS. 3 and 4 in conjunction with FIGS. 1 and 2. For purposes of identifying individual storage, drive and mail box compartments in library arrangements 12 and 14, the top row of the compartments in each arrangement, starting at the left end, as viewed in FIG. 3, will be designated as compartments 1A, 1B, 1C and so on. The compartments in the second row will be designated as compartments 2A, 2B, and so on, as shown in FIG. 4; the compartments in the third row will be designated as 3A, 3B, and so on. In operation, the various storage compartments are filled with information-containing discs though the mail boxes, one at a time, as indicated by arrow 90. In that case, compartment 1I serves as a mail box. When one mail box is used, carriage assemblies 26 and 28 can be used to transfer discs, one at a time, from the mail box to the various storage compartments. If two mail boxes are used, the carriage assemblies can be operated simultaneously. It is to be understood at the outset that a readily providable computer and associated computer software (not shown) is used to control operation of the apparatus and, hence, knows where each disc is at any given time. Neither the computer nor its software forms part of the present invention, per se, and will not be described further herein. It suffices merely to state that the computer takes the appropriate instructions from its operator and transfers information-containing discs between the mail box, disc storage and disc drive compartments in accordance with the instructions it receives.

Once the various storage compartments are filled, the carriage assemblies ca be used to transfer the information-containing discs between those compartments and the disc drives. As an example, an information-containing disc 18 is shown in FIG. 3 being transferred from storage compartment 1C in library arrangement 12 to the disc drive in compartment 1 of library arrangement 14 by means of carriage assembly 26. To this end, the carriage assembly is first moved from its previous position to a position immediately in front of compartment 1C in library arrangement 12 so that the front end 72 of the carriage assembly is directly adjacent to the front end of the compartment. Once the carriage assembly is in this position, its disc engaging and disengaging mechanism 70 is moved forward within the carriage frame 68 in order to pick up the disc in compartment 1C. After doing so, mechanism 70 is pulled back to its rearward position, bringing the disc into the carriage frame, as shown in FIG. 3. The entire carriage assembly and its post 36 (see FIGS. 1 and 2) are moved to the right, as viewed in FIG. 3, while at the same time the carriage assembly is rotated 180° about its vertical axis 52. In this way the carriage assembly can be placed in front of compartment 1W in library arrangement 14 with its front end 72 adjacent that compartment. With the carriage assembly in this latter position, its disc engaging and disengaging mechanism 70 is used to push the disc into the drive in compartment 1W. Note that the disc drive in that compartment has its read/write head 92 on the right side of the drive, as viewed in FIG. 3 and thus, side b of disc 18 will be acted upon by the read/write head. If the operator wanted to act on side a, frame 68 and the disc in the carriage assembly would have had to be rotated 180° about its horizontal axis 56.

For purposes of clarity, the procedure just described was illustrated in conjunction with FIG. 3 without illustrating carriage assembly 28. This latter carriage assembly is illustrated by itself in FIG. 4 as it transfers an information-containing disc from compartment 2E in library arrangement 12 to a disc drive in compartment 3R in the same library arrangement. Note that the carriage assembly moves downward and then to the right, as viewed in FIG. 4, but does not have to rotate about its vertical axis 60; since, both compartments are in the same library arrangement. However, the operator may wish to act on side "a" of the disc which is initially on its left side in compartment 2E, while the disc drive in compartment 3R has a single read/write head on its right side. This means that the carriage frame and disc must be rotated 180° about horizontal axis 64 of the carriage assembly as the assembly moves into position in front of the disc drive. This places side "a" of the storage disc adjacent read/write head 94 when the disc is inserted within the drive. The foregoing are two examples of how carriage assemblies 26 and 28 can be used to transfer discs between library compartments. In most cases, the carriage assemblies can be operated simultaneously in order to carry out commands. There are certain situations where this is not possible. Specifically, where the post of one carriage assembly is blocking a particular compartment being addressed by the other carriage assembly, the latter must wait until the first post moves out of the way. Also, where only one disc drive is available and both carriage assemblies have been commanded to address that disc drive, the carriage assemblies will have to take turns. It should be noted that the two carriage assemblies 26 and 28 can always pass one another in the X-direction while extending in the z-direction (as shown in FIGS. 1 and 2) so long as one is above the other in the y-direction, as shown in FIG. 1. If the two assemblies are at the same level vertically, to pass each other, they must be temporarily rotated 90° about their vertical axes 52 and 60 so as to extend in the x-direction. This would also be the case for movement of the carriage assemblies in the y-direction if they are at the same horizontal points on tracks 32 nd 34.

Overall apparatus 10 was described above in conjunction with two libraries 12 and 14 and two carriage assemblies 26 and 28. It is to be understood that the apparatus could function in accordance with variations of the present invention using a single library so long as it includes disc storage compartment (including a mailbox) and disc drives. The apparatus also contemplates using a single carriage assembly of the type to be described in more detail hereinafter in conjunction with FIGS. 5-10, although in a preferred embodiment two carriage assemblies are used. In this latter regard, even where two carriage assemblies are used, it may be necessary to service one of them and it would be desirable to do so without shutting down the apparatus. To this end, as best illustrated in FIG. 2, each track 32 and 34 extends beyond libraries 12 and 14 into maintenance areas 93 and 95 so that each carriage assembly and its associated post can be moved into a respective one of these areas for servicing. A door illustrated by dotted lines at 97 can be provided for safety purposes between one end of libraries 12 and 14 and the maintenance areas. The maintenance area 93 and 95 and door 97 are also shown in FIG. 7 and the means for moving posts 36 and 40 are configured to move them into these areas. Overall apparatus 10 will be described structurally in more detail in conjunction with FIGS. 5-10. These details will include the specific way in which each post is caused to move back and forth along its track, the way each carriage assembly is caused to move vertically up and down its post, the way each carriage assembly is caused to rotate about its horizontal and vertical axes, respectively, and the way each disc engaging and disengaging mechanism moves back and forth within its carriage frame in order to pull a disc into and push it out of the carriage frame. However, in addition to these specific structural components, the overall apparatus includes readily providable components that will not be described including readily providable sensors and limit switches used to sense and limit movement of the moving components and means for interfacing these components with the master computer so that the latter can move the components in the desired manner and know exactly where the various moving components are at any given time.

Turning to FIGS. 5-10, attention is directed to the contemplated working embodiment of apparatus 10. It is to be understood that the components in this embodiment that correspond with the components depicted in the diagrammatic illustration of FIGS. 1-4 will be designated buy like reference numbers. It is also to be understood that not every component making up apparatus 10 is necessarily illustrated in FIGS. 5-10 and that of those components that are illustrated, not all of them will be described herein. Rather, for purposes of clarity and brevity, only those components necessary to an understanding of the present invention will be described. In this regard, much of the description of apparatus 10 has already been provided in conjunction with FIGS. 1-4.

Figure 5:
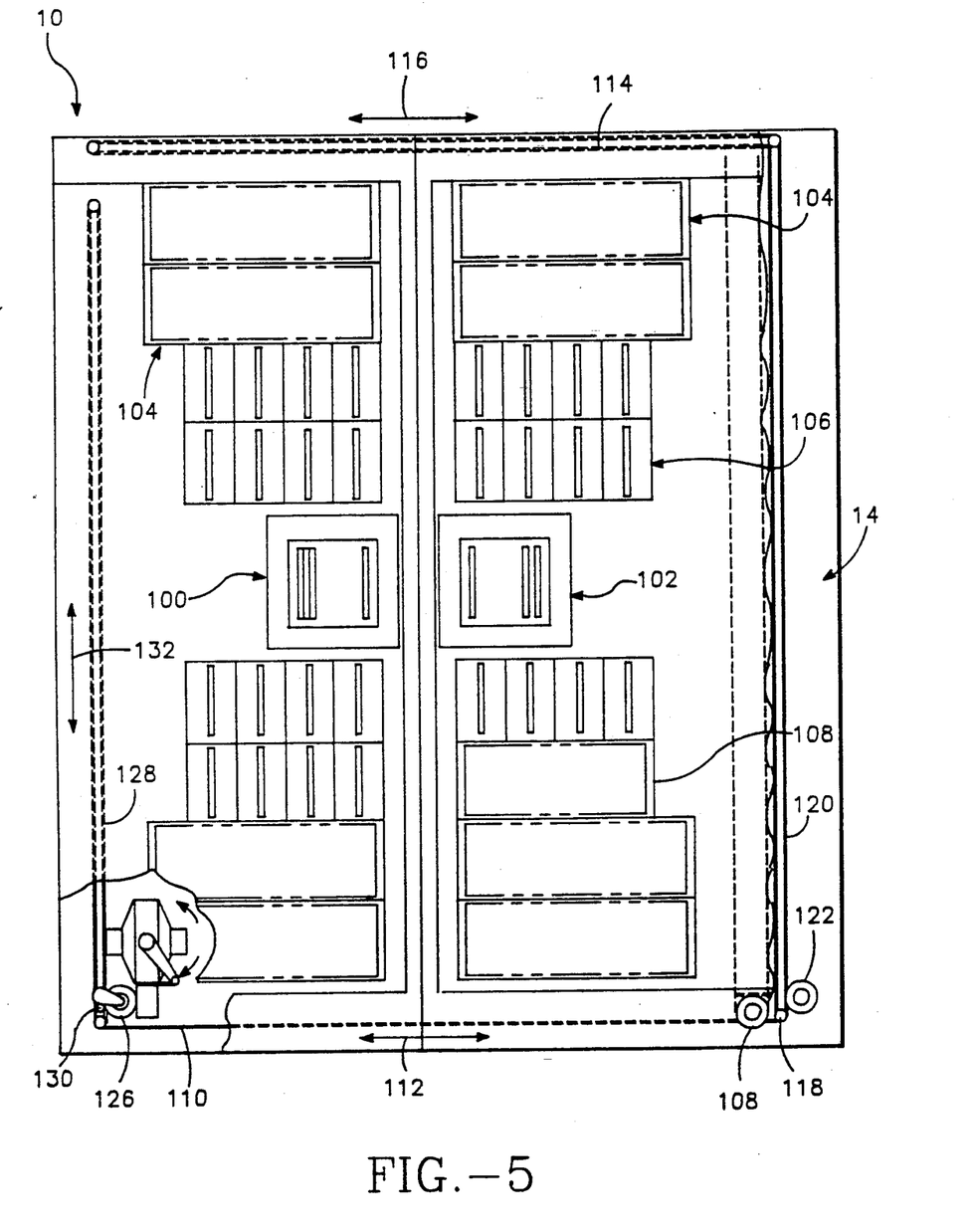
FIG. 5 is a front elevational view of a contemplated actual working embodiment of the apparatus diagrammatically depicted in FIGS. 1 and 2.
Figure 6:
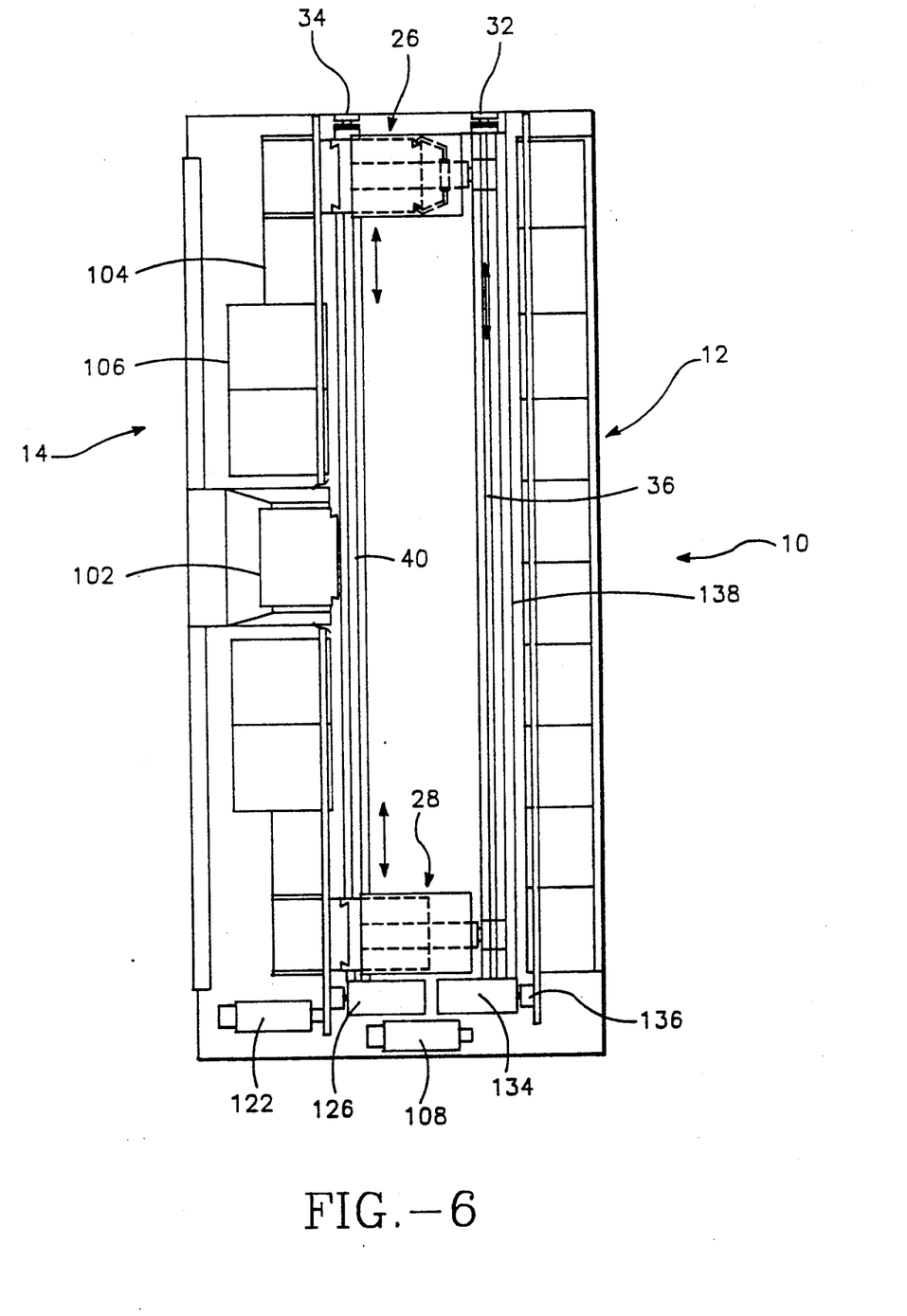
FIG. 6 is a side elevational view of the apparatus shown in FIG. 5.
Figure 7:
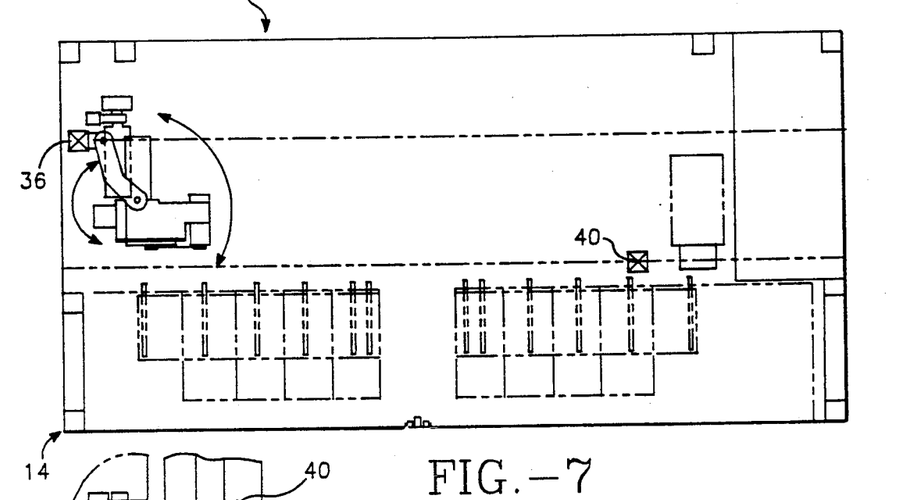
FIG. 7 is a top plan view of the apparatus shown in FIG. 5.

Turning first to FIGS. 5-7, the overall contemplated working embodiment of arrangement 10 is shown in front elevational view (FIG. 5), side elevational view (FIG. 6) and top plan view (FIG. 7). As best illustrated in FIG. 5, the exterior side of library arrangement 14 is shown including the entry (back) ends of two groups of mail boxes 100 and 102. The group 100 is provided for placing information-containing discs into the system and the group 102 is provided for taking them out. In this contemplated embodiment, the mail boxes, as well as the storage compartments and the drive compartments are provided as modules, rather than individually. Thus, mail box groups 100 and 102 are actually modules that can be installed into and removed from the overall framework forming part of library arrangement 14. Similar modules for the storage compartments are shown at 104 and modules for drive compartments are shown at 106. In some cases, these modules may be interchangeable. For example, the drive module 106 may be placed with the storage module 107.

Referring to FIGS. 6 and 7 in conjunction with FIG. 5, attention is directed to the way in which carriage assembly 28 and its associated post 40 are moved horizontally (in the X direction) and the way in which the carriage assembly is moved vertically along the post (in the Y direction). Movement of the post and carriage assembly in the X direction is powered by means of reversible motor 108 which is located at the base of the apparatus. As shown best in FIG. 5, motor 108 drives, directly, a horizontally extending belt 110 which is adjacent to, parallel with and extends the length of bottom track 34 shown in FIG. 1. This belt is supported by readily providable means so that its top and bottom sides move back and forth, as indicated by two-way arrow 112. Motor 108 also indirectly drives an upper horizontal endless belt 114 which is supported for the same type of back and forth movement, as indicated by two-way arrow 116. Endless belt 114 is located adjacent to, parallel with, and extends the length of upper track 34 shown in FIG. 1 and is disposed in vertical alignment with endless belt 110. Endless belt 114 is driven by motor 108 through a drive belt 118 which, in turn, powers a vertically extending belt 120 through suitable coupling means at one end of belt 120. The other end of endless belt 120 is coupled by suitable means with one end of endless belt 114 in order to drive the latter. Post 40 is fixedly connected at its bottom end to one side of endless belt 110 and is fixedly connected at its top end to one side of endless belt 114. While the post may be connected to belts 110 and 114 in this way, without splitting the belts, these latter belts could be split so that the post can be connected within the split. Even under these circumstances, these bolts and the others to be described will be referred to as "endless" belts. Thus as the sides of the endless belts connected to post 40 move back and forth in the X direction by motor 108, they move post 40 with them. Motor 108, which as stated above is a reversible motor, is controlled by the master computer in order to move post 40 and therefore carriage assembly 28 in the desired manner.

Post 36 is moved back and forth in the X direction in the same manner using a different reversible motor 122 and similar cooperating endless belts, not all of which are shown in the figures. However, it is to be understood that motor 122 drives a lower horizontal endless belt directly and an upper horizontal endless belt indirectly, in the same manner as motor 108 in order to move post 36 back and forth in the X direction.

Still referring to FIGS. 5-7, attention is directed to the way in which carriage assemblies 26 and 28 are moved vertically up and down their respective posts. Referring specifically to FIG. 5, a reversible electric motor 126 is used to power carriage assembly 28 up and down its post 40. This motor is coupled to one end of a vertically extending endless belt 128 through a drive belt 130 so that the motor can drive this endless belt vertically (in the Y direction) back and forth, as indicated by two-way arrow 132. Endless belt 128 extends the length of and moves with post 40 along with motor 126 and drive belt 130. Carriage assembly 28 is fixedly connected to one side of endless belt 128 so that as the latter moves back and forth vertically along post 40, the carriage assembly moves with it. The carriage assembly 26 is driven in a similar fashion along post 36 using reversible drive motor 134, as best seen in FIG. 6. The corresponding drive belt 136 and vertically extending endless belt 138 are also shown in these figures. Carriage assembly 26 is connected to one side of this latter endless belt for back and forth movement with it. Both motors 126 and 134 are operated by the master computer in the same way as motors 108 and 122.

Figure 8:
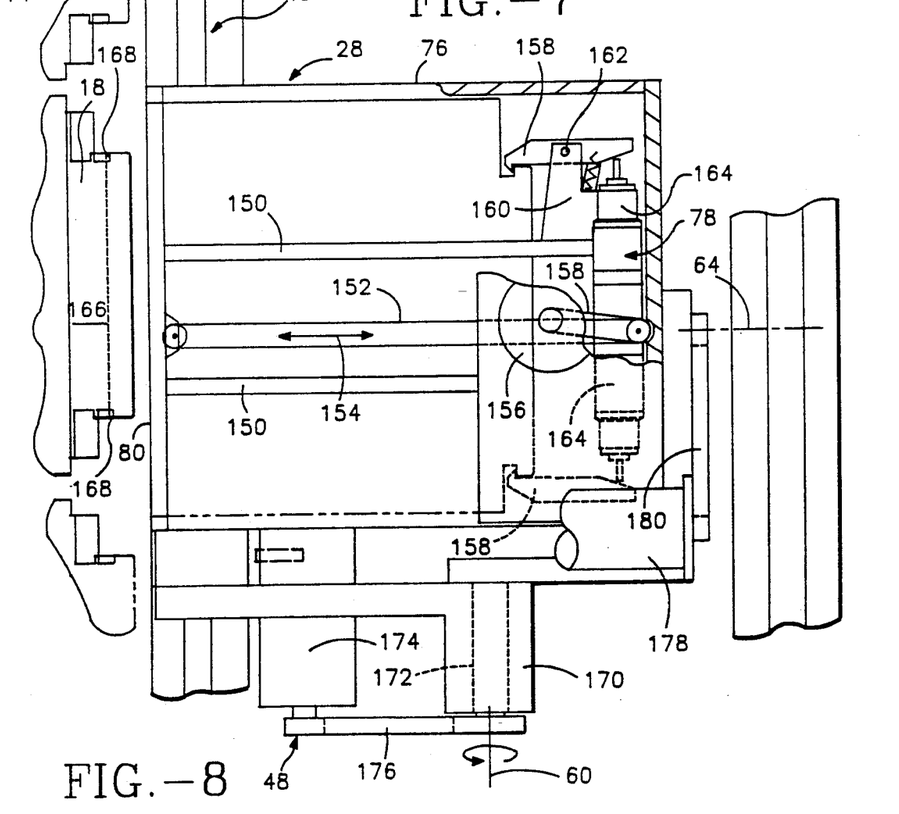
FIG. 8 is a side elevational view of part of the overall apparatus shown in FIGS. 5-7 including specifically one of its carriage assemblies.
Figure 9:
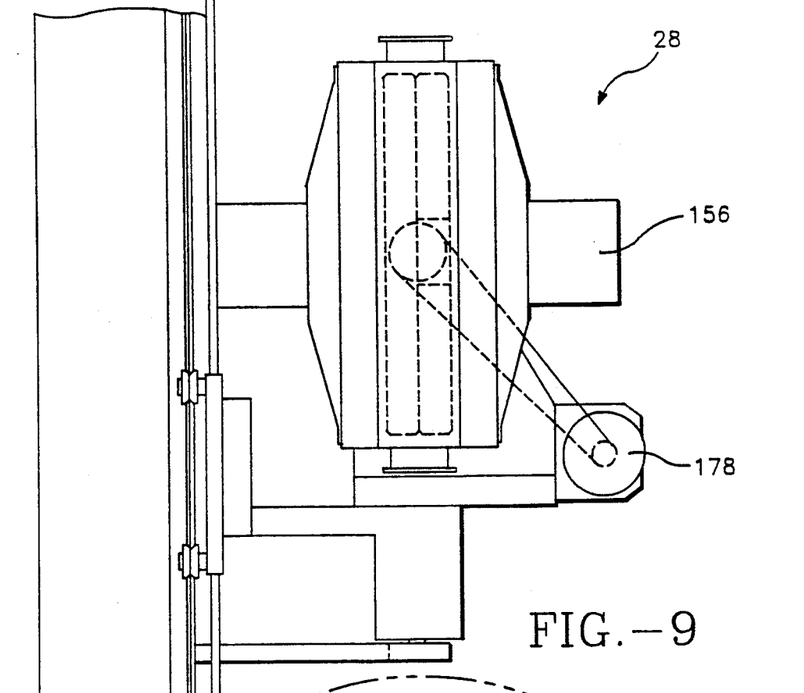
FIG. 9 is a front elevational view of the carriage assembly shown in FIG. 8.
Figure 10:
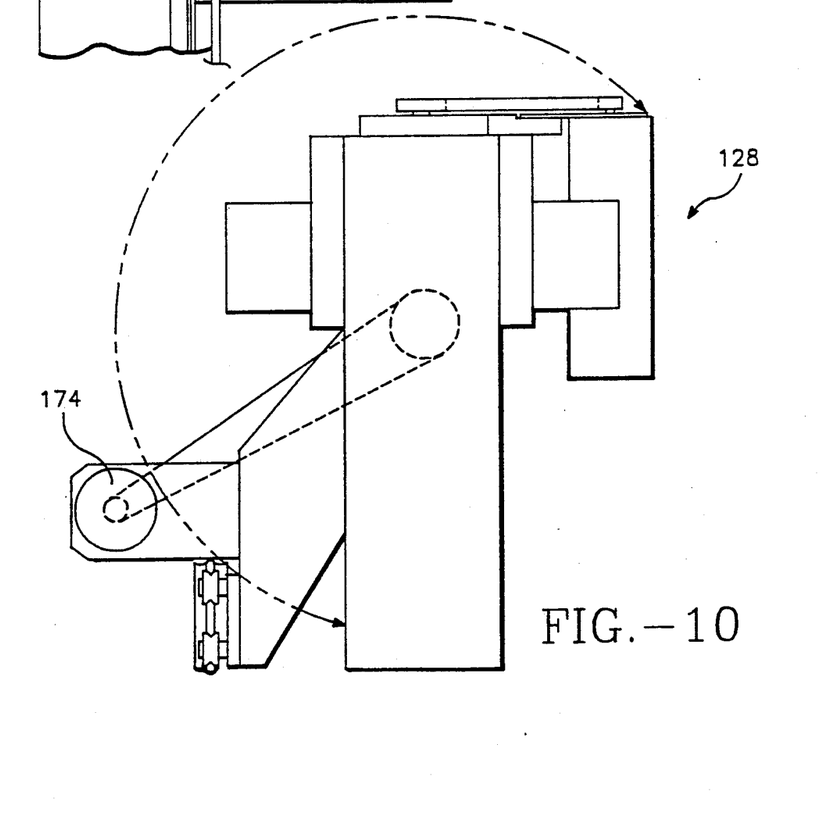
FIG. 10 is a top plan view of the carriage assembly shown in FIG. 9.

Turning now to FIGS. 8–10, attention is directed to the structural details making up the anticipated working embodiment of carriage assembly 28. Inasmuch as carriage assemblies 26 and 28 may be structurally identical, only assembly 28 will be described here. Moreover, it is to be understood that only those structural details pertinent to a general understanding of the assembly will be provided. The remaining details illustrated are not discussed and may be readily provided by those with ordinary skill in the art in view of the teachings herein.

As illustrated in FIG. 8, carriage assembly 28 is shown including its previously recited main frame 76 and opened front end 80. The previously recited engaging and disengaging mechanism 78 is shown positioned within main frame 76. This mechanism is mounted for back and forth movement within the main frame in the z-direction along spaced-apart and parallel guide rails 150 extending from the back end of the main frame to its front end within the main frame. Mechanism 78 is fixedly connected to one side of an endless belt 152 which is disposed between and extends the length of rails 150. The endless belt 152 is moved back and forth, as indicated by two-way arrow 154, by means of a reversible electric motor 156 which drives endless belt 152 through a cooperating drive belt 157. The back and forth movement of endless belt 152 causes disc engaging and disengaging mechanism 78 to move with it. Motor 156 is controlled by means of the previously recited master computer to move mechanism 78 in the desired manner, as will be described immediately below.

As stated previously, mechanism 78 is designed to pull an information-containing disc into and push it out of main frame 76 of carriage assembly 28. To this end, the mechanism includes a pair of grippers 158, each of which is mounted to a cooperating flange arrangement 160 for pivotal movement about an axis 162 (which extends into the plane of the paper in FIG. 8). The upper gripper 158 in FIG. 8 is shown in its closed or gripping position by solid lines and its opened or non-gripping positions by dotted lines. This gripper and the lower gripper 158 are spring biased in their opened, non-gripping positions. A pair of linear electromagnetic solenoids 164 also forming part of the overall mechanism 78 serve to move the grippers to their gauging positions. More specifically, as illustrated in FIG. 8, the upper solenoid 164 acts along the back end of gripper 158 so that when the solenoid is energized it pushes the back end of the gripper forward, causing the front end of the gripper to move to its gripping position. This is also true for the lower solenoid and the lower gripper. When both solenoids are deenergized, the grippers are allowed to move back to their biased, non-gripping positions.

With the description of grippers 158 and their associated solenoid in mind, attention is now directed to the way in which mechanism 78 pulls a disc into and pushes it out of main frame 76 of carriage assembly 28. To this end, it will be assumed first that the carriage assembly is in position directly in front of a storage compartment with a disc 18 in the compartment. FIG. 8 shows such a disc. Note that the disc, actually its outer cartridge housing which is generally indicated at 166 includes a pair of outer grooves 168. With carriage assembly 28 in the position shown in FIG. 8, motor 156 is used to drive mechanism 78 to its forwardmost position adjacent front end 80. As it does so, the grippers 158 which initially remain in their nongripping positions, extend over the front ends of cartridge housing 166 in alignment with grooves 168. At that time, the solenoids 164 are energized, causing the grippers to move into their gripping positions, thereby gripping the front ends of the cartridge housing within grooves 168. Thereafter, the entire mechanism 78 is moved back to its rearwardmost position, pulling the cartridge housing and the disc therein into main frame 76, as shown in FIG. 8. Once the disc and its cartridge housing are within the carriage assembly, the solenoids 164 can be de-energized. This procedure is reversed to push the disc end cartridge housing out of the carriage frame and into either a storage compartment or disc drive.

As indicated previously, carriage assembly 28, specifically its main frame 76, is supported for rotation about vertical axis 60 and horizontal axis 64 for the reasons described. Both of the axes are shown in FIG. 8. Note that the main frame 76 is pivotally mounted on a pivot bracket 170 which in turn is mounted for vertical movement along post 40. Bracket 170 supports main frame 76 by means of a vertically extending bearing arrangement which is diagrammatically indicated by dotted lines at 172. A reversible electric motor 174 forming part of overall carriage assembly 28 drives bearing assembly 172 back and forth, at least 180°, about axis 60 by means of a drive belt 176. Motor 174, like the other previously recited motors, is operated by the master computer to rotate main frame 76 about axis 60 when required.

Main frame 76 is rotated about horizontal axis 64 by means of a separate and distinct reversible electric motor 178, a cooperating guide belt 180, and a bearing arrangement (not shown). Motor 178 is also operated by the master computer to rotate the main frame about axis 64 when necessary.

It is to be understood that carriage assembly 26 can be identical to carriage assembly 28, as described above. Therefore, the structural details of carriage assembly 26 will not be provided herein.

The foregoing has been a description of overall apparatus 10, both from the diagrammatic viewpoint (FIGS. 1–4) and from the standpoint of an actual contemplated embodiment (FIGS. 5–10). As stated previously, these descriptions did not include all of the structural details of the apparatus. Some structural details are shown in the figures but were not described and some are not shown at all. However, those structural details pertinent to the present invention have been shown and/or described. With particular regard to the necessary sensors and limit switches required to move the various movable components of the apparatus at the right time and in the right way, these components are readily providable along with the master computer and associated software in view of the teachings herein.

What is claimed is:

1. An apparatus for storing and retrieving information containing discs, comprising:
   (a) a disc and drive library including a plurality of individual storage compartments for storing information-containing discs and at least two drive compartments, each containing a disc drive for storing information on and retrieving information from said discs;
   (b) first carriage means on a first track for transferring an information-containing disc between any two of said storage compartments or between a disc drive and any one of said storage compartments;
   (c) second carriage means on a first track separate from said first carriage means for transferring an information-containing disc between any two of said storage compartments or between a disc drive and any one of said storage compartments; and
   (d) means for moving said first and second carriage means independent of each other to transfer information-containing discs between said storage and drive compartments of said library such that said first carriage means transfers one disc into or out of one of said storage or drive compartments while said second carriage means is simultaneously used to independently transfer a second disc into or out of a different one of said storage or drive compartments, said means further being configured for cooperatively moving said first and second carriage means around each other such that all of said storage and drive compartments within said library are accessed by either said first or said second carriage means at any given time during operation of the apparatus.

2. An apparatus according to claim 1 wherein said means for moving said first and second carriage means includes separate first and second horizontal track arrangements and first and second means for supporting said first and second carriage means for movement on said first and second track arrangements, respectively.

3. An apparatus according to claim 2 wherein each of said means for supporting a given one of said carriage means includes a vertically extending main support post mounted for movement to and along a respective one of said track arrangements and means supporting said given carriage means for movement to and along said post, whereby each of said carriage means is simultaneously movable along its track arrangement and up and down its post in order to move between compartments of said library.

4. An apparatus according to claim 3 wherein said library compartments are arranged in a plurality of horizontal rows vertically aligned on top of one another so as to also define a plurality of vertical columns, and wherein said first and second track arrangements are both located in front of said compartments in parallel relationship with said horizontal rows of compartments, so that said posts extend parallel with said columns of compartments.

5. An apparatus according to claim 4 including a second disc and drive library having a plurality of individual storage compartments for storing information-containing discs arranged in a plurality of horizontal rows vertically aligned on top of one another so as to define a plurality of vertical columns, said second library being positioned in confronting, parallel relationship with said first-mentioned library with said first and second track arrangements, said first and second carriage means, and said first and second means for supporting said carriage means disposed between the two libraries.

6. An apparatus according to claim 5 wherein each of said carriage means includes a carriage frame for containing an information-containing disc and means for pulling said disc into and pushing it out of the carriage frame through the front end of the frame, and wherein each of said means for supporting a given one of said carriage means includes means for rotating the frame of that carriage means 180° about a vertical axis in order to place its front end in confronting relationship with either of said libraries, whereby to transfer an information-containing disc between that given carriage means and either of said libraries.

7. An apparatus according to claim 6 wherein each of said means for supporting a given one of said carriage means includes means for rotating the frame of that carriage means 180° about a horizontal axis in order to be able to alternate the way in which a disc is placed in a disc drive, whereby either side of a two-sided information-containing disc can be acted upon by a disc drive having a single read/write head.

8. An apparatus according to claim 7 wherein each of said carriage means includes a disc engaging and disengaging mechanism movable within its associated frame between the front end of the latter and its back end in order to pull a disc into and push it out of the frame.

9. An apparatus according to claim 8 wherein at least one of said storage compartments of at least one of said libraries includes means for gaining access to that compartment from its back end for placing an information-containing disc into and removing it from that compartment outside the library.

10. An apparatus according to claim 6 wherein said first and second means for supporting said first and second carriage means each include means for cooperatively rotating said frames of said first and second carriage means 90° about a vertical axis to enable said first and second carriage means to move past each other as said first and second means for supporting said carriage means move along said track means.

11. An apparatus according to claim 1 wherein said means for moving said first and second carriage means includes horizontal track means and first and second means for supporting said first and second carriage means for movement on said track means.

12. An apparatus according to claim 11 wherein said track means includes separate first and second horizontal track arrangements and whereby said first and second means for supporting said first and second carriage means support said first and second carriage means on said first and second tracks, respectively.

13. An apparatus according to claim 11 wherein each of said means for supporting a given one of said carriage means includes a vertically extending main support post mounted for movement to and along said track means and means supporting said given carriage means for movement to and along said post, whereby each of said carriage means is simultaneously movable along its track means and up and down said post in order to move between compartments of said library.

14. An apparatus according to claim 13 wherein said library compartments are arranged in a plurality of horizontal rows vertically aligned on top of one another so as to define a plurality of vertical columns, and wherein said track means is located in front of said compartments in parallel relationship with said horizontal rows of compartments, so that said posts extend parallel with said columns of compartments.

15. An apparatus according to claim 11 wherein said track means extend horizontally beyond said library and into a maintenance area horizontally to one side of said library and wherein said moving means includes means for independently moving each of said carriage means along said track means and into said maintenance area for servicing whereby when one carriage means is being maintained, the other carriage means is able to access all of said compartments of said library.

16. An apparatus according to claim 1 wherein said disc and drive library includes a library arrangement in which at least some of said library compartments are arranged in a plurality of horizontal rows vertically aligned on top of one another so as to also define a plurality of vertical columns.

17. An apparatus according to claim 16 wherein said disc and drive library includes a second library arrangement in which some of said library components are arranged in a plurality of horizontal rows vertically aligned on top of one another so as to define a plurality of columns, said first-mentioned library arrangement and said second library arrangement being disposed in confronting, parallel relationship with one another, and wherein said means for moving said first and second carriage means independent of each other includes means for moving said carriage means vertically and horizontally between said library arrangements.

18. An apparatus according to claim 17 wherein each of said carriage means includes a carriage frame for containing an information-containing disc and means for pulling a disc into and pushing it out of the carriage frame through the front end of the frame, and wherein each of said means for supporting a given one of said carriage means includes means for rotating the frame of that carriage means 180° about a vertical axis in order to place its front end in confronting relationship with either of said library arrangements, whereby to transfer an information-containing disc between that given carriage means and either of said library arrangements.

19. An apparatus according to claim 18 wherein said first and second means for supporting said first and second carriage means each includes means for cooperatively rotating said frames 90° about a vertical axis to enable said first and second carriage means to move past each other as said means for supporting said carriage means moves along said tracks.

20. A method of storing and retrieving information-containing discs, comprising the steps of:
(a) providing a disc and drive library including a plurality of individual storage compartments for storing information-containing discs and at least two drive compartments, each containing a disc drive for storing information on and retrieving information from said discs;
(b) providing first and second independent and separate carriage arrangement on separate tracks, each of which transfers an information-containing disc between any two of said storage and drive compartments included within said library; and
(c) independently operating said first and second carriage arrangements, for movement around one another if necessary, for simultaneously and independently transferring a first disc between any two of said storage and said drive compartments while transferring a second disc between any two of the other storage and drive compartments, whereby said first carriage arrangement transfers said first disc into or out of one of said storage or drive compartments while said second carriage arrangement is simultaneously used to independently transfer said second disc into or out of any other storage or drive compartments.

21. A method according to claim 20 wherein said disc and drive library includes first and second confronting library arrangements, each of which has some of said compartments arranged in a plurality of horizontal rows vertically aligned on top of one another so as to define a plurality of vertical columns, and wherein said step of transferring information-containing discs between said compartments includes the step of transferring said discs between two compartments which are in one of dais library arrangements or which are located in different ones of both said arrangements.

22. A method according to claim 21 including the step of independently moving each of said carriage arrangements horizontally beyond said library arrangements for servicing in maintenance areas located to one side of said arrangement such that, while one carriage arrangement is being services, the other carriage arrangement is able to access all of said compartments of said disc drive.

23. A method of storing and retrieving information-containing discs, comprising the steps of:
(a) providing a disc and drive library including a plurality of individual storage compartments for storing information-containing discs and at least two drive compartments, each containing a disc drive for storing information on and retrieving information from said discs;
(b) providing a first carriage which transfers an information-containing disc between any two of said storage compartments or between a disc drive and any one of said storage compartments;
(c) moving said first carriage along a first track which extends into a maintenance area beyond said library for transferring a given disc between compartments of said library;
(d) periodically moving said carriage on said track and into said maintenance area for servicing therein; and
(e) providing a second carriage on a second track which extends into said maintenance area for independent operation with said first carriage, each of which transfers an information-containing disc between any two of said storage compartments or between a disc drive and any one of said storage compartments, and each of which is independently movable into said maintenance area for servicing, whereby when one of said carriages is being services, the other is able to access all of said compartments.

24. An apparatus for storing and retrieving information containing discs, comprising:
(a) a disc and drive library including a plurality of individual storage compartments for storing information-containing discs and at least two drive compartments, each containing a disc drive for storing information on and retrieving information from said discs;
(b) a first carriage which transfers an information-containing disc between any two of said storage compartments or between a disc drive and any one of said storage compartments;
(c) first means for moving said first carriage along a first track means which extends into said maintenance area beyond said library for transferring a given disc between compartments of said library;
(d) first means for periodically moving said first carriage on said first track and into said maintenance area for servicing thereon;
(e) a second carriage which transfers an information-containing disc between any two of said storage compartments or between a disc drive and any one of said storage compartments;
(f) second means for moving said second carriage along a second track means which extends into said maintenance area beyond said library for transferring a given disc between compartments of said library;
(g) second means for periodically moving said second carriage on said second track and into said maintenance area for servicing thereon; and
(h) said first and second carriages providing independent operation to simultaneously transfer information containing discs between any two of said storage compartments or between a disc drive and any one of said storage compartments.

25. An apparatus according to claim 24 including means for independently and periodically moving said second carriage to one side of said library along track means extending into a maintenance area for servicing of said second carriage.

* * * * *